Figures 1, 2:
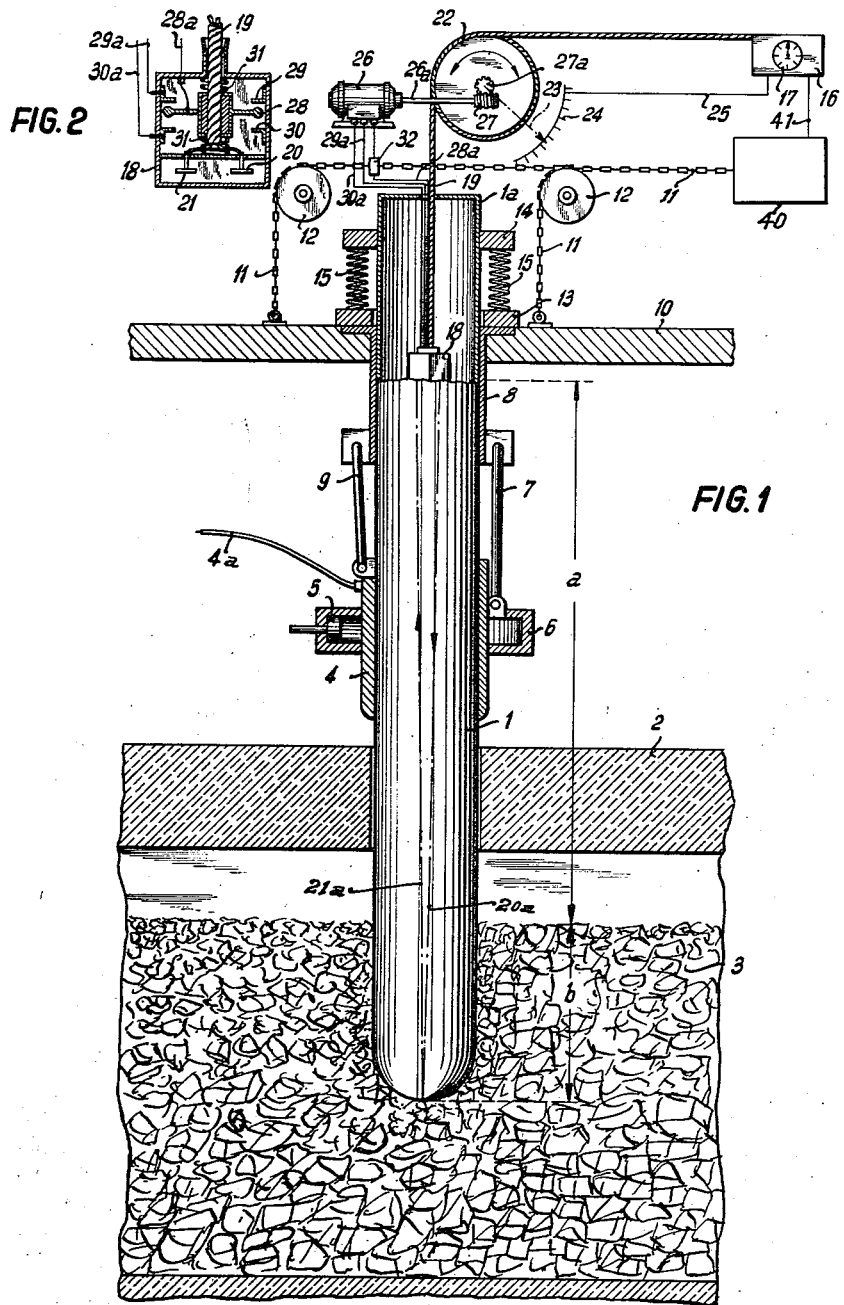

Oct. 9, 1956     C. RESCHKE     2,766,313

FURNACE IMPROVEMENT

Filed Nov. 8, 1955

INVENTOR

Carl Reschke by Michael S. Striker

Agt.

United States Patent Office 2,766,313
Patented Oct. 9, 1956

2,766,313

FURNACE IMPROVEMENT

Carl Reschke, Duisburg, Germany, assignor to Demag-Elektrometallurgie G. m. b. H., Duisburg, Germany Application November 8, 1955, Serial No. 545,645

20 Claims. (Cl. 13—13)

The present invention relates to a new and improved method and apparatus for the operation of electric arc furnaces and reduction furnaces.

More particularly, the present invention relates to a new and improved method and apparatus for automatically regulating the depth of an electrode in the charge of an electric arc furnace or a reduction furnace.

In electric arc furnaces and reduction furnaces, the depth that the electrode used therein is inserted within the charge of the furnace is constantly regulated. This depth of insertion of the electrode in turn regulates the current consumption of the furnace.

This regulation cannot always be properly maintained since the electrode may assume an unfavorable position within the charge due to an improper makeup of the charge within the furnace or due to other influences. For example, the charge may be improperly compounded so that it has too high an electrical conductivity. If this is the case, the current consumption of the electrode will be high and the regulating apparatus for the electrode will raise the electrode so that the inserted depth thereof within the charge will be smaller. The result is that the lower part of the furnace becomes too cold while the upper part thereof becomes overheated.

In open furnaces the defective composition of the charge and the resultant changing of the electrode position can usually be quickly rectified so that the electrode can be repositioned in the charge with its bottom end inserted the desired predetermined amount. However, in covered furnaces this defect is very difficult to ascertain and it cannot be easily corrected.

In accordance with the present invention the depth that the bottom end of the electrode is inserted within the charge is automatically determined and regulated by the transmission of an electrical or ultrasonic impulse therethrough and by establishing the time difference between the transmission of the impulse and the reception of an impulse reflected from the bottom end thereof.

It is accordingly an object of the present invention to overcome the above described disadvantages of electrode positioning in electric arc furnaces, reduction furnaces and the like.

Another object of the present invention is to provide a new and improved method and apparatus for automatically determining the position of an electrode within the charge of an electric arc furnace.

A further object of the present invention is to provide a new and improved method and apparatus for automatically regulating the depth to which an electrode is inserted within the charge of an electric arc furnace.

Still another object of the present invention is to provide a new and improved method and apparatus for properly positioning an electrode within an electric arc furnace.

Still a further object of the present invention is to provide a method and apparatus for regulating the depth to which an electrode is inserted within the charge of an electric arc furnace by transmitting an impulse from the upper end of an electrode to the bottom end thereof and by establishing the time difference between the transmission of the impulse and the reception of the reflected impulse from the bottom end.

Yet another object of the present invention is to provide an apparatus having an improved contact arrangement for determining the position of the upper surface of an electrode in an electric arc furnace or the like.

With the above objects in view, the present invention mainly consists of a method of determining the depth of one end of an electrode within the charge of an electric arc furnace, including the steps of generating an impulse, transmitting the generated impulse through the electrode to the one end thereof within the charge, the impulse being reflected from the one end, receiving the reflected impulse and establishing the elapsed time between the transmission of the generated impulse and the reception of the reflected impulse.

In one embodiment of the present invention the apparatus is provided for automatically regulating the depth of one end of an electrode within the charge of an electric arc furnace or the like including means for generating an impulse, means for transmitting the generated impulse through the electrode to the one end thereof within the charge, the impulse being reflected from the one end, means for receiving the reflected impulse, means for establishing the elapsed time between the transmission of the generated impulse and the reception of the reflected impulse, and means for varying the depth of the electrode within the charge until the elapsed time reaches a predetermined value.

In another embodiment, the present invention includes a housing adapted to be mounted on the upper surface of an electrode in an electric arc furnace or the like having a contact arrangement connected to a motor which is capable of changing the position of the housing with respect to the upper surface of the electrode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic arrangement of one embodiment of the present invention; and Fig. 2 shows the interior constructional details of a portion of the apparatus illustrated in Fig. 1.

Referring to the drawings and more particularly to Fig. 1, an electrode 1 is shown inserted through an opening in the cover 2 of a furnace so that the bottom end of the electrode 1 is positioned within the charge 3 inside of the furnace. It can be seen that the bottom end of the electrode 1 is inserted to a depth $b$ below the top surface of the charge 3. The distance between the top surface of the electrode 1 and the top surface of the charge is indicated by the distance $a$.

Current to the electrode 1 is supplied by the contact jaws 4 and the conductor 4a connected thereto. The pressure with which the jaws 4 are maintained against the surface of the electrode can be varied by the hydraulic or compressed air piston 5 which is located within the peripheral support 6. The support 6 is connected by means of a rod 7 to one end of a cylindrical support 8, the other end of which is fixedly mounted on a movable carrying beam 10. The contact jaws 4 are also connected to one end of the cylindrical support 8 by means of a rod 9.

The carrying beam 10 may be raised or lowered by chains 11 connected over pulleys 12 to a motor control

40. The motor control 40 may be operated to raise or lower the carrying beam 10 which in turn causes the respective raising and lowering of the electrode 1. The illustrated electrode 1 is a "Soderberg electrode" which is well known in the art to be a continuous self-baking electrode. To form such an electrode, the electrode mixture is tamped into an electrode shell and the portion of the electrode near the furnace becomes baked so that the part of the electrode below the holder is a solid carbon electrode encased in a steel jacket. When new electrode material is needed, a new section of steel casing is welded to the top of the old casing and filled with the electrode mixture.

In Fig. 1 the casing 1a holding the electrode 1 is shown slidably mounted within the cylindrical support 8. Surrounding the casing 1a at the upper end thereof are clamping rings 13 and 14 separated by a spring 15. It is seen that the carrying beam 10 can lower the electrode 1 only up to a distance wherein the contact jaws 4 approach the cover 2 of the furnace. If the beam 10 is lowered any farther, the jaws 4 would contact the cover 2 of the furnace, which of course is undesirable.

In order to insert more of the electrode into the charge 3 of the furnace even after the carrying beam 10 has reached its lowermost position, the clamping rings 13 and 14 are provided. It can be seen that the ring 13 has an inner diameter which is larger than the outer diameter of the casing 1a. Rings 13 and 14 are conventional clamping rings which may be made in two separate parts, respectively, which may be moved towards or away from each other. The two parts of the clamping ring 13 are shown separate while the two parts of the clamping ring 14 are shown moved towards each other so that they clamp the casing 1a between them in the position shown. Due to the weight of the electrode 1, the electrode and the clamping ring 14 will move slowly downward between the contact jaws 4, thereby compressing the spring 15. When the downward weight exerted by the electrode 1 is substantially equal to the upward force exerted by the compressed spring 15, the electrode 1 will come to a fixed position. The two parts of the clamping ring 13 are then moved together, by a conventional mechanism not illustrated, to clamp the casing 1a therebetween. The clamping ring 14 is then opened and moved upwardly by the compressed spring 15. The electrode 1 will then be maintained in the desired position by the clamping ring 13.

If, after more of the electrode material is used up from the bottom end thereof, it is desired to insert more of the electrode 1 within the charge 3, the parts of the clamping ring 14 are moved together, the parts of the clamping ring 13 are separated, and the hereinabove described process is repeated.

The specific means for operating the clamping rings 13 and 14 are not illustrated because this forms no part of the present invention.

The present invention includes the apparatus for determining and regulating the distance $b$ that the bottom end of electrode 1 is inserted within the charge 3. On the upper surface of the electrode 1 is shown a housing 18 which is adapted to make contact therewith. Supporting the housing is an electrical conductor 19 which is wound about a drum 22 and is connected to a transmitting and receiving apparatus 16 which generates, transmits and receives electrical or ultrasonic impulses. Mounted on the axis of the drum 22 is a worm gear 27a which is adapted to be driven by a worm 27 that in turn is mounted on a shaft 26a rotatable by a motor 26. The motor 26 has three conductors, 28a, 29a, and 30a, respectively, connected thereto. As seen in Fig. 2 the other end of conductor 28a is connected to a pair of diametrically opposed contacts 28, which are movable between a pair of fixed contacts 29 and 30. The contacts 29 and 30 are connected respectively to the opposite ends of the conductors 29a and 30a.

Also shown in Fig. 2 is the other end of the conductor 19 which is connected to the dipoles 20 and 21. The conductor 19 can actually be a plurality of conductors so that the dipoles 20 and 21 can be connected respectively to different conductors within the cable 19 if desired.

Also connected to the worm gear 27a on the drum 22 is a pointer 23 which moves with the rotation of the drum 22 and varies its position along an indicating scale 24.

In operation, at the start of operation of the furnace, the electrode 1 is lowered through the cover 2 of the furnace until its bottom end contacts the upper surface of the charge 3. In this position the drum 22 is rotated to lower the housing 18 until it reaches the upper surface of the electrode 1 and is positioned there with the conductor 19 being in substantially taut condition. The indicator 23 is then set to a point of reference on the scale 24. This sets the initial distance $a$ between the top surface of the charge 3 and the top surface of the electrode 1. The electrode 1 is then lowered by means of the carrying beam 10 to a desired depth for the particular material in the charge. When the electrode 1 is lowered, the housing 18 initially remains in its original position. However, the weight of the housing causes the same to move downwardly. The housing carries with it the contacts 29 and 30 which are connected thereto while leaving the contacts 28 in their original position. Therefore, the contacts 29 will mate with the contacts 28 and connect the conductor 28a of the motor 26 to the conductor 29a thereof. This will cause the motor 26 to be energized and to rotate the drum 22 in a direction to lower the housing 18. The housing 18 will continue to be lowered until the bottom thereof comes into contact with the upper surface of the electrode 1. When this happens, the conductor 19, which has been lowering the housing 18, will continue in a downwardly direction moving the contacts 28 connected thereto out of contact with the contacts 29. This will place the contact arrangement in circuit-opening position and cause the motor 26 to be de-energized. Therefore, the housing 18 and the dipoles 20 and 21 mounted therein will always be maintained in a predetermined position with respect to the upper surface of the electrode.

It can be seen that if the electrode 1 is moved upwardly by the carrying beam 10, the housing 18 will move with the electrode so that the contacts 30 will mate with the contacts 28. This will connect the conductors 29a and 30a together and energize the motor to cause the same to rotate the drum 22 in the opposite direction and raise the housing 18.

Because the housing 18 is thus maintained in a predetermined position with respect to the upper surface of the electrode 1, the position of the dipoles 20 and 21 mounted therein will also be maintained in a predetermined position. The transmitting and receiving apparatus 16 can therefore generate a high frequency impulse which is transmitted through the conductor 19 to the transmitting dipole 20 which emits the same to cause the impulse to be transmitted through the electrode 1 until it reaches the bottom end thereof. This generated impulse is transmitted along the dotted lines 20a in the direction shown by the arrows. When the impulse reaches the bottom of the electrode 1, it will be reflected along the path 21a back to the receiving dipole 21 and from there through the conductor 19 to the transmitting and receiving apparatus 16.

The apparatus 16 may be a conventional apparatus having components for determining the elapsed time between the generation and transmission of the original impulse and the reception of the reflected impulse. Such apparatus is used, for example, in conjunction with radar apparatus. This information accurately determines the total length $a+b$ of the electrode 1. The indicator 23 on the drum 22 indicates the distance $a$ which may be different from the original reference point setting. Therefore, by subtracting the distance $a$, which may be different, from the sum $a+b$, the distance $b$ is determined.

It is apparent that the scale 24 may be a potentiometer connected to a source of potential and the indicator 23 may be the movable arm of the potentiometer. Therefore, the movement of the arm 23 automatically supplies a voltage which is proportional to the distance $a$. This voltage may be applied by a conductor 25 to the apparatus 16 so that this apparatus may automatically subtract the voltages corresponding respectively to $a$ and $a+b$ from each other and thereby automatically indicate the distance $b$ on an indicator 17 thereof.

In addition to visually indicating the depth $b$ of the electrode 1 within the charge 3, the apparatus 16 can also apply a voltage on a conductor 41 of the motor control 40 which includes a motor for raising and lowering the carrying beam 10 through the chains 11.

It should be realized that it is not possible to determine the depth of the electrode within the charge 3 while the furnace is operating merely by ascertaining the amount of the electrode above the cover 2 of the furnace. This results from the fact that the electrode 1 is inserted and withdrawn from the furnace by two different adjusting apparatuses. One of the adjusting apparatus is the carrying beam 10 which can raise the electrode 1 or lower it down to a predetermined distance. The other adjusting apparatus is the alternate operation of the clamping rings 13 and 14 which moves the electrode casing 1a and the electrode 1 relative to the carrying beam 10. Therefore, the present invention by means of the transmission and reflection of the impulses provides information useful for the regulation of the electrode current and also permits automatic operation of the furnace.

It is possible that an ultrasonic impulse can be used instead of high frequency impulses since the ultrasonic impulse can also be reflected from the bottom of the electrode 1 back to the top surface thereof.

In Fig. 2 it can be seen that a coil spring 31 is provided within the housing 18 to resiliently urge the contacts 28 towards a central position between the fixed contacts 29 and 30. This spring does not provide sufficient restraining force to overcome the effect of the weight of the housing 18 when it is unsupported by the electrode 1. However, the spring 31 prevents a continuous hunting arrangement where the movable contacts 28 will continuously oscillate back and forth between the contacts 29 and 30 to momentarily energize the motor 26 for operation in first one and then the other direction.

Another means for overcoming this hunting or oscillating effect is shown by the time delay relay 32 which is connected in series with the conductor 28a. This time delay relay can be set up so that the relay will not close unless the contacts 28 have made contact with the fixed contacts 29 or 30 for a predetermined time.

The present invention also is particularly advantageous when used with the Soderberg electrode since the conductor 19 and the housing 18 can be removed from the top of the casing 1a. The new electrode material can then be added into the casing 1a and a new casing welded thereto whenever desired. The housing 18 and conductor 19 can then be replaced on top of the upper surface of the new electrode.

It will be understood that each of the elements described above, or two or more together, may also find a useful application in other types of regulating apparatus differing from the types described above.

While the invention has been illustrated and described as embodied in a method and apparatus for regulating the position of an electrode in an electric arc furnace, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of determining the depth of one end of an electrode within the charge of an electric arc furnace, comprising the steps of generating an impulse; transmitting said generated impulse through the electrode to said one end thereof within said charge, said impulse being reflected from said one end; receiving said reflected impulse; and establishing the elapsed time between the transmission of said generated impulse and the reception of said reflected impulse.

2. A method of automatically regulating the depth of one end of an electrode within the charge of an electric arc furnace, comprising the steps of generating an impulse; transmitting said generated impulse through the electrode to said one end thereof within said charge, said impulse being reflected from said one end; receiving said reflected impulse; establishing the elapsed time between the transmission of said generated impulse and the reception of said reflected impulse; and varying the depth of the electrode within the charge until said elapsed time reaches a predetermined value.

3. A method of determining the depth of one end of an electrode within the charge of an electric arc furnace, comprising the steps of generating a high frequency impulse; transmitting said generated high frequency impulse through the electrode to said one end thereof within said charge, said impulse being reflected from said one end; receiving said reflected impulse; and establishing the elapsed time between the transmission of said generated impulse and the reception of said reflected impulse.

4. A method of determining the depth of one end of an electrode within the charge of an electric arc furnace, comprising the steps of generating an ultrasonic impulse; transmitting said generated ultrasonic impulse through the electrode to said one end thereof within said charge, said impulse being reflected from said one end; receiving said reflected impulse; and establishing the elapsed time between the transmission of said generated impulse and the reception of said reflected impulse.

5. A method of determining the depth of one end of an electrode within the charge of an electric arc furnace, comprising the steps of generating an impulse; transmitting said generated impulse through the electrode to said one end thereof within said charge, said impulse being reflected from said one end; receiving said reflected impulse; establishing the elapsed time between the transmission of said generated impulse and the reception of said reflected impulse; and visually displaying the established elapsed time.

6. A method of determining the distance that the bottom of an electrode is inserted within the charge of an electric arc furnace comprising the steps of adjusting the distance between the top of said electrode and the top of said charge within said electric arc furnace; generating an impulse; transmitting said impulse through the electrode from the top to the bottom thereof, said impulse being reflected back from the bottom to the top of the electrode; receiving said reflected impulse; establishing the elapsed time between the transmission of said impulse and the reception of said reflected impulse; and automatically converting said established elapsed time and said adjusted distance between the top of said electrode and the top of said charge into the distance of said bottom of the electrode beneath the top of said charge.

7. A method of determining the distance that the bottom of an electrode is inserted within the charge of an electric arc furnace comprising the steps of adjusting the distance between the top of said electrode and the top of said charge within said electric arc furnace; generating an impulse; transmitting said impulse through the electrode from the top to the bottom thereof, said impulse being reflected back from the bottom to the top of the electrode; receiving said reflected impulse; establishing the elapsed time between the transmission of said impulse and the reception of said reflected impulse; automatically converting said established elapsed time and said adjusted distance between the top of said electrode and the top of said charge into the distance of said bottom of the electrode beneath the top of said charge; and varying the distance of said bottom of the electrode beneath the top of said charge until said elapsed time reaches a predetermined value.

8. A method of determining the distance that the bottom of an electrode is inserted within the charge of an electric arc furnace comprising the steps of adjusting the distance between the top of said electrode and the top of said charge within said electric arc furnace; generating a high frequency impulse; transmitting said high frequency impulse through the electrode from the top to the bottom thereof, said impulse being reflected back from the bottom to the top of the electrode; receiving said reflected impulse; establishing the elapsed time between the transmission of said impulse and the reception of said reflected impulse; and automatically converting said established elapsed time and said adjusted distance between the top of said electrode and the top of said charge into the distance of said bottom of the electrode beneath the top of said charge.

9. Apparatus for determining the depth of one end of an electrode within the charge of an electric arc furnace comprising, in combination, means for generating an impulse; means for transmitting said generated impulse through the electrode to said one end thereof within said charge, said impulse being reflected from said one end; means for receiving said reflected impulse; and means for establishing the elapsed time between the transmission of said generated impulse and the reception of said reflected impulse.

10. Apparatus for automatically regulating the depth of one end of an electrode within the charge of an electric arc furnace comprising, in combination, means for generating an impulse; means for transmitting said generated impulse through the electrode to said one end thereof within said charge, said impulse being reflected from said one end; means for receiving said reflected impulse; means for establishing the elapsed time between the transmission of said generated impulse and the reception of said reflected impulse; and means for varying the depth of the electrode within the charge until said elapsed time reaches a predetermined value.

11. Apparatus for determining the depth of one end of an electrode within the charge of an electric arc furnace comprising, in combination, means for generating an impulse; means for transmitting said generated impulse through the electrode to said one end thereof within said charge, said impulse being reflected from said one end; means for receiving said reflected impulse; means for establishing the elapsed time between the transmission of said generated impulse and the reception of said reflected impulse; and means for visually displaying the established elapsed time.

12. Apparatus for determining the distance that the bottom of an electrode is inserted within the charge of an electric arc furnace comprising, in combination, means for automatically determining the distance between the top of the electrode and the top of the charge within the furnace; means for generating an impulse; means for transmitting said generated impulse through the electrode from the top to the bottom thereof, said impulse being reflected back from the bottom to the top of the electrode; means for receiving said reflected impulse; and means for establishing the elapsed time between the transmission of said generated impulse and the reception of said reflected impulse.

13. Apparatus for determining the distance that the bottom of an electrode is inserted within the charge of an electric arc furnace comprising, in combination, generating means for generating an electrical impulse; a housing adapted to make contact with the top surface of said electrode; transmitting and receiving means mounted within said housing; at least one electrical conductor connected between said generating means and said transmitting and receiving means whereby an electrical impulse generated in said generating means which is applied through said electrical conductor to said transmitting and receiving means is transmitted from the top surface to said bottom of said electrode and is reflected therefrom back to said top surface and said receiving means; and means for establishing the elapsed time between the transmission of said generated impulse and the reception of said reflected impulse.

14. Apparatus for determining the distance that the bottom of an electrode is inserted within the charge of an electric arc furnace comprising, in combination, generating means for generating an electrical impulse; a housing adapted to make contact with the top surface of said electrode; transmitting and receiving means mounted within said housing; at least one electrical conductor connected between said generating means and said transmitting and receiving means whereby an electrical impulse generated in said generating means which is applied through said electrical conductor to said transmitting and receiving means is transmitted from the top surface to said bottom of said electrode and is reflected therefrom back to said top surface and said receiving means; means for establishing the elapsed time between the transmission of said generated impulse and the reception of said reflected impulse; and means for indicating the distance between the top surface of said electrode and the top surface of said charge within said furnace.

15. Apparatus for automatically regulating the distance that the bottom of an electrode is inserted within the charge of an electric arc furnace comprising, in combination, generating means for generating an electrical impulse; a housing adapted to make contact with the top surface of said electrode; transmitting and receiving means mounted within said housing; at least one electrical conductor connected between said generating means and said transmitting and receiving means whereby an electrical impulse generated in said generating means which is applied through said electrical conductor to said transmitting and receiving means is transmitted from the top surface to said bottom of said electrode and is reflected therefrom back to said top surface and said receiving means; means for establishing the elapsed time between the transmission of said generated impulse and the reception of said reflected impulse; and means for varying the depth of the electrode within the charge until said elapsed time reaches a predetermined value.

16. Apparatus for automatically regulating the distance that the bottom of an electrode is inserted within the charge of an electric arc furnace comprising, in combination, generating means for generating an electrical impulse; a housing adapted to make contact with the top surface of said electrode; transmitting and receiving means mounted within said housing; at least one electrical conductor connected between said generating means and said transmitting and receiving means whereby an electrical impulse generated in said generating means which is applied through said electrical conductor to said transmitting and receiving means is transmitted from the top surface to said bottom of said electrode and is reflected therefrom back to said top surface and said receiving means; means for establishing the elapsed time between the transmission of said generated impulse and the reception of said reflected impulse; means for varying the depth of the electrode within the charge until said elapsed time reaches a predetermined value; an electrical contact arrangement mounted within said housing and operable between a circuit-opening position when said housing is in contact with said top surface of said electrode and a circuit-closing position when said housing is out of contact with said top surface; and actuating means electrically connected to said contact arrangement for changing the position of said housing with respect to the top surface of said electrode, said actuating means being energized when said contact arrangement is in circuit-closing position and being de-energized when said contact arrangement is in circuit-opening position.

17. Apparatus for automatically regulating the distance that the bottom of an electrode is inserted within the charge of an electric arc furnace comprising, in combination, generating means for generating an electrical impulse; a housing adapted to make contact with the top surface of said electrode; transmitting and receiving means mounted within said housing; at least one electrical conductor connected between said generating means and said transmitting and receiving means whereby an electrical impulse generated in said generating means which is applied through said electrical conductor to said transmitting and receiving means is transmitted from the top surface to said bottom of said electrode and is reflected therefrom back to said top surface and said receiving means; means for establishing the elapsed time between the transmission of said generated impulse and the reception of said reflected impulse; means for varying the depth of the electrode within the charge until said elapsed time reaches a predetermined value; an electrical contact arrangement mounted within said housing and operable between a circuit-opening position when said housing is in a predetermined position relative to said top surface of said electrode and a circuit-closing position when said housing is in a position different from said predetermined position; and actuating means electrically connected to said contact arrangement for changing the position of said housing with respect to the top surface of said electrode, said actuating means being energized when said contact arrangement is in circuit-closing position and being de-energized when said contact arrangement is in circuit-opening position.

18. Apparatus for determining the distance that the bottom of an electrode is inserted within the charge of an electric arc furnace comprising, in combination, generating means for generating an electrical impulse; a housing adapted to make contact with the top surface of said electrode; a transmitting dipole mounted within said housing; a receiving dipole mounted within said housing; at least one electrical conductor connected between said generating means and said transmitting and receiving dipoles whereby an electrical impulse generated in said generating means which is applied through said electrical conductor to said transmitting dipole is transmitted from the top surface to said bottom of said electrode and is reflected therefrom back to said top surface and said receiving dipole; and means for establishing the elapsed time between the transmission of said generated impulse and the reception of said reflected impulse.

19. Apparatus for determining the distance that the bottom of an electrode is inserted within the charge of an electric arc furnace comprising, in combination, generating means for generating an ultrasonic impulse; a housing adapted to make contact with the top surface of said electrode; transmitting and receiving means mounted within said housing; at least one conductor connected between said generating means and said transmitting and receiving means whereby an impulse generated in said generating means which is applied through said transmitting and receiving means is transmitted from the top surface to said bottom of said electrode and is reflected therefrom back to said top surface and said receiving means; and means for establishing the elapsed time between the transmission of said generated impulse and the reception of said reflected impulse.

20. Apparatus for automatically regulating the distance that the bottom of an electrode is inserted within the charge of an electric arc furnace comprising, in combination, generating means for generating an electrical impulse; a housing adapted to make contact with the top surface of said electrode; transmitting and receiving means mounted within said housing; at least one electrical conductor connected between said generating means and said transmitting and receiving means whereby an electrical impulse generated in said generating means which is applied through said electrical conductor to said transmitting and receiving means is transmitted from the top surface to said bottom of said electrode and is reflected therefrom back to said top surface and said receiving means; means for establishing the elapsed time between the transmission of said generated impulse and the reception of said reflected impulse; means for varying the depth of the electrode within the charge until said elapsed time reaches a predetermined value; an electrical contact arrangement mounted within said housing and operable between a circuit-opening position when said housing is in contact with said top surface of said electrode and a circuit-closing position when said housing is out of contact with said top surface; a motor electrically connected to said contact arrangement and connected to said housing for changing the position of said housing with respect to the top surface of said electrode, said motor being energized when said contact arrangement is in circuit-closing position and being de-energized when said contact arrangement is in circuit-opening position; and means for normally maintaining said contact arrangement in circuit-opening position.

References Cited in the file of this patent

UNITED STATES PATENTS

| | | |
|---|---|---|
| Re. 12,658 | Heroult | June 4, 1907 |
| 1,573,095 | Saklatwalla et al. | Feb. 16, 1926 |
| 2,280,226 | Firestone | Apr. 21, 1942 |
| 2,550,528 | Carlin | Apr. 24, 1951 |
| 2,648,056 | Jakosky | Aug. 4, 1953 |
| 2,713,263 | Turner | July 19, 1955 |
| 2,721,948 | Jordan | Oct. 25, 1955 |